(12) United States Patent
Hsieh et al.

(10) Patent No.: US 9,065,298 B2
(45) Date of Patent: Jun. 23, 2015

(54) PHOTOVOLTAIC SYSTEM HAVING POWER-INCREMENT-AIDED INCREMENTAL-CONDUCTANCE MAXIMUM POWER POINT TRACKING CONTROLLER USING VARIABLE-FREQUENCY AND CONSTANT-DUTY CONTROL AND METHOD THEREOF

(75) Inventors: Guan-Chyun Hsieh, Taoyuan County (TW); Hung-I Hsieh, Chiayi (TW); Chun-Kong Chan, New Taipei (TW)

(73) Assignees: Chung Yuan Christian University, Chung Li (TW); Amicord Corp., Taipei (TW)

( * ) Notice: Subject to any disclaimer, the term of this patent is extended or adjusted under 35 U.S.C. 154(b) by 180 days.

(21) Appl. No.: 13/619,468

(22) Filed: Sep. 14, 2012

(65) Prior Publication Data

US 2013/0249295 A1 Sep. 26, 2013

(30) Foreign Application Priority Data

Mar. 22, 2012 (TW) .............................. 101109928 A

(51) Int. Cl.
*H02J 7/35* (2006.01)
*H02M 3/28* (2006.01)

(52) U.S. Cl.
CPC .... *H02J 7/35* (2013.01); *H02M 3/285* (2013.01); *Y02E 10/566* (2013.01); *Y02E 10/58* (2013.01)

(58) Field of Classification Search
USPC ......................................................... 307/43
See application file for complete search history.

(56) References Cited

U.S. PATENT DOCUMENTS

| 8,743,574 | B2* | 6/2014 | Roy et al. ...................... 363/59 |
| 2007/0290651 | A1* | 12/2007 | McNulty et al. .............. 318/800 |
| 2012/0326649 | A1* | 12/2012 | Patanaik et al. ............... 318/453 |

FOREIGN PATENT DOCUMENTS

| TW | 201020712 A | 6/2010 |
| TW | 201042416 A | 12/2010 |
| TW | 201116966 A | 5/2011 |
| TW | 201140276 A | 11/2011 |

OTHER PUBLICATIONS

Interleaved Smart Burp PV Charger for Lead Acid Batteries with Incremental Conductance MPPG by Guan—Cyun Hsieh.*
Variable Frequency Controlled Incremental Conductance Derived MPPT Photovoltaic Stand-Along DC Bus System Guan—Cyun Hsieh.*
Interleaved Smart Burp PV Charger for Lead Acid Batteries with Incremental Conductance MPPT by Guan—Cyun Hsieh; 2008.*
Variable Frequency Controlled Incremental Conductance Derived MPPT Photovoltaic Stand-Along DC Bus System Guan—Cyun Hsieh; 2011.*
Hsieh, Guan-Chyun, Chen, Shih-Wei, and Tsai, Cheng-Yuan, "Interleaved Smart Burp PV Charger for Lead Acid Batteries with Incremental Conductance MPPT," 2011 IEEE Energy Conversion Congress & Exposition, pp. 3248-3255.

(Continued)

*Primary Examiner* — Rexford Barnie
*Assistant Examiner* — Daniel Kessie
(74) *Attorney, Agent, or Firm* — Haynes and Boone, LLP

(57) ABSTRACT

The configurations of photovoltaic system and methods thereof are provided. The proposed photovoltaic system includes a PI-INC MPPT controller using a variable-frequency constant-duty (VFCD) control and guided by an Ipv-Vpv curve and a Ppv-Vpv curve.

15 Claims, 11 Drawing Sheets

(56) References Cited

OTHER PUBLICATIONS

Hsieh, Guan-Chyun, Chen, Hung-Liang, Chen, Yaohwa, Tsai, Chee-Ming, and Shyu, Shian-Shing, "Variable Frequency Controlled Incremental Conductance Derived MPPT Photovoltaic Stand-Along DC Bus System," Applied Power Electronics Conference and Exposition, Chaper IV, pp. 1849-1854, 2008.

Taiwan Patent Office, Office action for patent application serial No. TW 101109928, dated May 19, 2014. 6 pages.

* cited by examiner

PHOTOVOLTAIC SYSTEM HAVING POWER-INCREMENT-AIDED INCREMENTAL-CONDUCTANCE MAXIMUM POWER POINT TRACKING CONTROLLER USING VARIABLE-FREQUENCY AND CONSTANT-DUTY CONTROL AND METHOD THEREOF

CROSS-REFERENCES TO RELATED APPLICATIONS

The application claims the benefit of Taiwan Patent Application No. 101109928, filed on Mar. 22, 2012, in the Taiwan Intellectual Property Office, the disclosures of which are incorporated herein in their entirety by reference.

FIELD OF THE INVENTION

The present invention relates to a photovoltaic (PV) system having a power-increment-aided incremental-conductance (PI-INC) maximum power point tracking (MPPT) controller. In particular, it relates to the photovoltaic system having the PI-INC MPPT controller using a variable-frequency constant-duty control.

BACKGROUND OF THE INVENTION

FIG. 1(a) shows a circuit diagram of an equivalent circuit of a typical solar cell unit, wherein D is an LED, Rsh is a parallel-connected inner resistor, Rs is a series-connected inner resistor, and Iph is an output current of the solar cell unit. There are six well-known solar energy MPPT techniques including voltage feedback method, power feedback method, practical measurement method, linear approximation method, perturbation and observation method and incremental conductance method.

In these six methods, the perturbation and observation method is the most widely used one. This method uses the perturbation to measure the new output voltage and current of the two sides of the solar panel, calculate its power, and compare with the power sampled last time to get its change amount. If the new power value is higher than the power value of last time, it represents that the perturbation direction is correct. Otherwise, the direction of perturbation shall be reversed. And, the next movement of adding or subtracting the perturbation is decided accordingly. Since the procedure of perturbation will constantly change the output power of the solar panel (or the PV array), the last operating point would be stabilized within a small range around the maximum power point (MPP). The drawback of this method is that the procedure of perturbation will never be ceased, which will cause oscillation around the MPP, result in the energy loss and decrease the efficiency of conversion.

The incremental conductance method is applied via a principle that a rate of change of an output power with respect to a voltage of a solar panel is zero at an MPPT, and at a place corresponding to dP/dV=0 on the current-voltage characteristic curve, e.g. as shown in FIG. 1(b), and the incremental conductance method directly finds out $$\frac{\Delta I}{\Delta V} = -\frac{I}{V}, \quad (1)$$

where I is a solar cell current, V is a solar cell voltage, ΔV is a voltage increment, and ΔI is a current increment. Via measuring a conductance value of ΔI/ΔV and compared it with an instantaneous conductance of −I/V of the solar panel to judge whether ΔI/ΔV is larger than, smaller than, or equivalent to −I/V so as to determine whether the next incremental change should be continued. When the incremental conductance conforms to formula (1), the solar panel is for sure to be operated at a maximum power point (MPP), and there will be no more next increment. This method engages in a tracking via the modification of the logic expression, there is not any oscillation around the MPP such that it is more suitable to the constantly changing conditions of the atmosphere. The incremental conductance method can accomplish the MPPT more accurately and decrease the oscillation problem as in the perturbation and observation method, but it still has some drawbacks. As shown in FIG. 1(b), using the curve of insolation 1000 W/m2 as an example, if it is detected at the very beginning that the solar panel is working at point A on the Ipv-Vpv curve, that is at the left-hand side of point C (the MPP), and corresponding to point A' on the Ppv-Vpv curve, the (photovoltaic) system will cause the solar panel to move its operating point from A to its right-hand side and track towards the point C. On the contrary, if it is detected that the solar panel is working at point B on the Ipv-Vpv curve, that is at the right-hand side of point C (the MPP), and corresponding to point B' on the Ppv-Vpv curve, then the system will cause the solar panel to move its operating point from B to its left-hand side and track towards the point C. Finally, when the detected conductance value of ΔI/ΔV satisfies formula (1), the system will keep the operating point of the solar panel at point C of the Ipv-Vpv curve and at point C' of the Ppv-Vpv curve to maintain the maximum power output of the solar panel. However, the drawbacks of the incremental conductance method are that at the left-hand side of point C (the MPP) of the Ipv-Vpv curve, it is found that the change of current with respect to voltage is almost a constant value in most of the sections, and is approximately equal to the short-circuit current, and at the right-hand side of point C, the problem is the change of voltage with respect to current is not obvious. In other words, at the left-hand side of point C, the change of current with respect to voltage is relatively insensitive and has a poor responsibility. On the contrary, at the right-hand side of point C, the change of voltage with respect to current is relatively insensitive. However, the best tracking range of the incremental conductance method is in the area around point C, where the changes of current and voltage are relatively obvious, and it has a superior responsibility. But, on the left-hand side and the right-hand side of point C, there are respectively drawbacks of the change of current with respect to voltage is relatively insensitive and the change of voltage with respect to current is relatively insensitive such that result in the incremental conductance method could not give full scope of its function and there are phenomena of tardiness and slow response speed when engaged in the MPPT, which will influence the output efficiency of the maximum power.

Keeping the drawbacks of the prior arts in mind, and employing experiments and research full-heartily and persistently, the applicant finally conceived a photovoltaic system having a power-increment-aided incremental-conductance maximum power point tracking controller using a variable-frequency constant-duty control and method thereof.

SUMMARY OF THE INVENTION

It is a primary objective of the present invention to provide a photovoltaic system having a power-increment-aided incremental-conductance maximum power point tracking controller using a variable-frequency constant-duty control. This technique includes PI-MPPT and INC-MPPT, and sets up a threshold tracking zone in the area with obvious changes on the Ipv-Vpv curve around point C. If the power increment falls into the threshold tracking zone, the system enters the INC fine tracking and uses the Ipv-Vpv curve as a tracking standard. On the contrary, if the power increment falls outside the threshold tracking zone, the system enters the PI coarse tracking and uses the Ppv-Vpv curve as a tracking standard. The proposed photovoltaic system has a relatively quick response and a relatively better output efficiency of the maximum power when engaged in the MPPT.

According to the first aspect of the present invention, a photovoltaic system with a photovoltaic current (Ipv), a photovoltaic voltage (Vpv), a photovoltaic power (Ppv), a control frequency (fs) and an output power (Po), wherein there is a derivative (dIpv/dVpv) of Ipv with respect to Vpv includes a power-increment-aided incremental-conductance (PI-INC) maximum power point tracking (MPPT) controller guided by a control chart, wherein the control chart includes an Ipv-Vpv curve and a Ppv-Vpv curve, a dIpv/dVpv-Vpv curve, a dIpv/dVpv-fs curve, and a Po-fs curve.

According to the second aspect of the present invention, a photovoltaic system with a photovoltaic current (Ipv), a photovoltaic voltage (Vpv) and a photovoltaic power (Ppv) includes a controller having circuit characteristics represented by an Ipv-Vpv curve and a Ppv-Vpv curve.

According to the third aspect of the present invention, a method for operating a controller of a photovoltaic system with a photovoltaic current (Ipv), a photovoltaic voltage (Vpv) and a photovoltaic power (Ppv), includes a step of: providing an Ipv-Vpv curve and a Ppv-Vpv curve to be used to determine whether a specific conductance derivative ratio of dIpv/dVpv enters a threshold tracking zone.

The present invention can be best understood through the following descriptions with reference to the accompanying drawings, in which:

DETAILED DESCRIPTION OF THE PREFERRED EMBODIMENT

Although the following description contains many specifications for the purposes of illustration, anyone of ordinary skill in the art will appreciate that many variations and alterations to the following details are within the scope of the invention. Accordingly, the following preferred embodiment of the invention is set forth without any loss of generality to and without imposing limitations upon, the claimed invention.

Figure 1B:
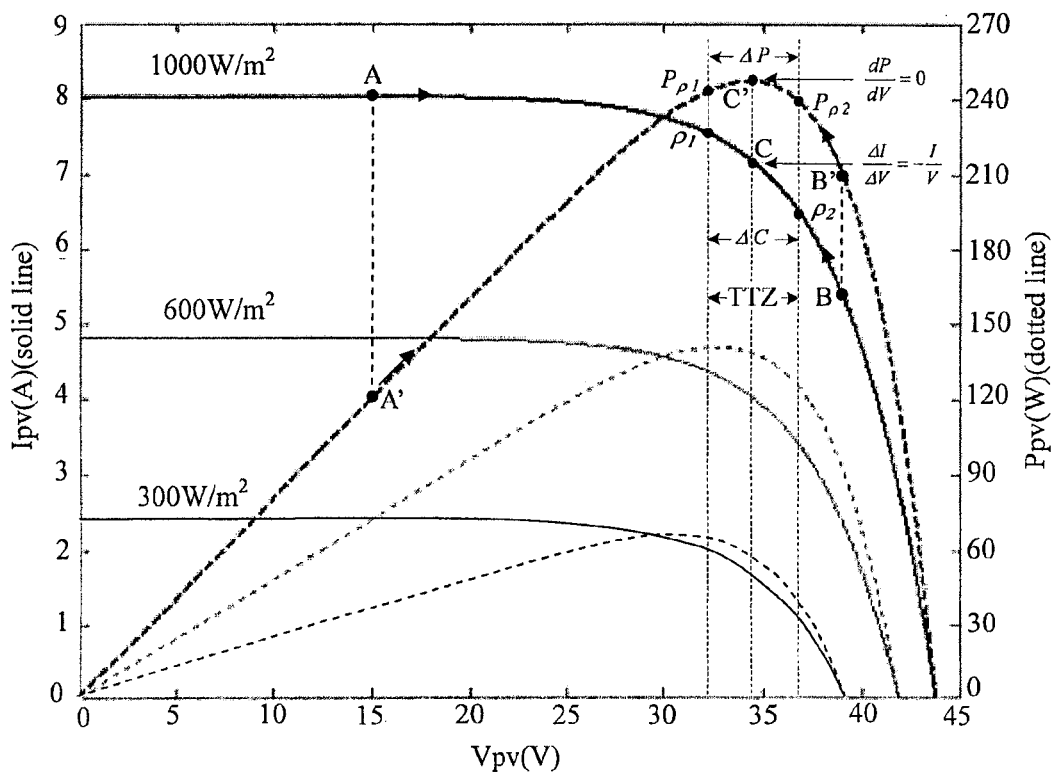
FIG. 1(b) shows a waveform diagram with Ipv-Vpv and Ppv-Vpv curves having designated threshold tracking zones.
Figure 2A:
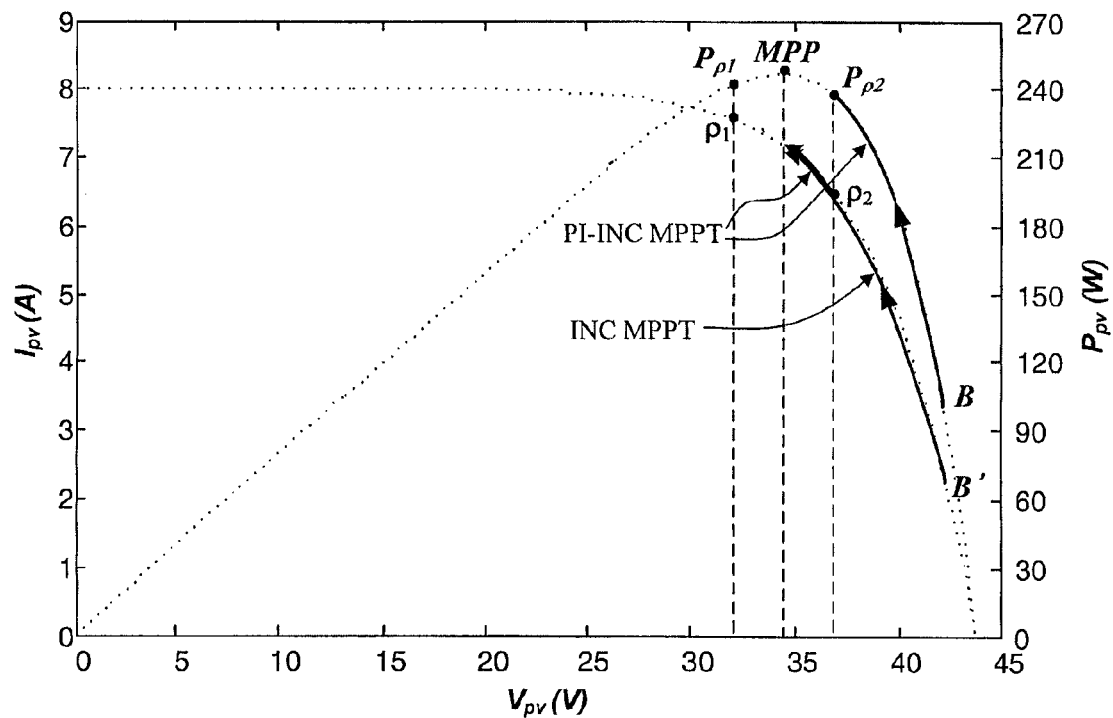
FIGS. 2(a)-2(b) respectively show the a waveform diagram of the various tracking routes of the PI-INC MPPT method proposed by the present invention and the INC MPPT method when they are fallen on the right-hand side and the left-hand side of the MPP.
Figure 2B:
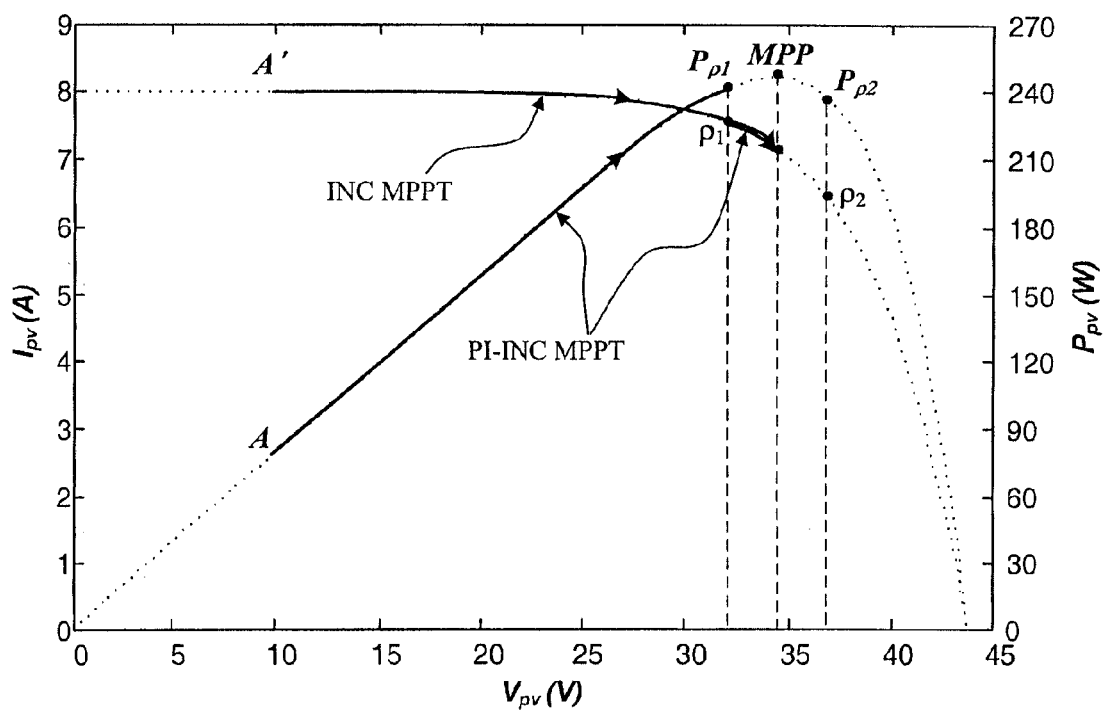

Due to the aforementioned drawbacks of the prior art, the present invention provides a PI-INC MPPT technique, this technique consists of PI-MPPT and INC-MPPT, the PI-MPPT is named as coarse-tracking and the INC-MPPT is named as fine-tracking. This motivation results from the observation of the power curve Ppv-Vpv as shown in FIG. 1(b). At the two sides of the MPP C', the changes of the power are in direct proportion to the voltage, and there is no such problems of tardiness and insensitive response area as those on the Ipv-Vpv curve. Thus, the proposed method of the present invention preserves the unique advantage of accurately tracking around the MPP C of the incremental conductance method, that is to set up the threshold tracking zone (TTZ) in the area having obvious changes on the Ipv-Vpv curve around point C as shown in FIG. 1(b), which is equivalent to define the points ($\rho 1$, $\rho 2$) on the Ipv-Vpv curve as a conductance threshold zone (CTZ=$\Delta$C), or corresponding to define points ($P_{\rho 1}$, $P_{\rho 2}$) on the Ppv-Vpv curve as a power threshold zone (PTZ=$\Delta$P). The principles of this technique are that the system detects the power $P_{n+1}$ generated by the new output voltage and the new output current of the two sides of the solar panel, and $P_{n+1}$ is compared with the previously sampled power Pn, that is the power increment $\Delta P = P_{n+1} - P_n$. If the power increment $\Delta P$ falls into the range of threshold ($P_{\rho 1}$, $P_{\rho 2}$), the system will immediately enter the fine-tracking of the incremental conductance, and use the Ipv-Vpv curve as the tracking standard. On the contrary, if the power increment $\Delta P$ falls outside the range of threshold ($P_{\rho 1}$, $P_{\rho 2}$), the system will immediately enter the coarse-tracking of the power increment, and use the Ppv-Vpv curve as the tracking standard. Using FIG. 1(b) as an example to describe the MPPT of the present invention, for example, if the detected voltage and current, and the computed power at certain moment respectively fall on point A of Ipv-Vpv curve, and point A' of the Ppv-Vpv curve, and the computed power increment $\Delta P = P_{n+1} - P_n$ falls outside the range of threshold ($P_{\rho 1}$, $P_{\rho 2}$), the system will immediately employ the power increment tracking and use the Ppv-Vpv curve as a tracking standard so as to drive the point A' to be moved to point C' rapidly and to track until the power threshold point $P_{\rho 1}$. Correspondingly, the point A on the Ipv-Vpv curve is moved to C during this period and is tracked until the threshold point $\rho 1$. The tracking function of the power increment principle in this area is relatively sensitive and definite than that of the conventional incremental conductance principle. Similarly, if the detected voltage and current, and the computed power respectively fall on point B of Ipv-Vpv curve, and point B' of the Ppv-Vpv curve, as aforementioned, the same power increment tracking principle will be employed to engage in the tracking phenomenon. If the detected voltage and current, and the computed power respectively fall in the range of threshold ($P_{\rho 1}$, $P_{\rho 2}$), that is the corresponding range of ($\rho 1$, $\rho 2$), the system will immediately start the fine-tracking of the incremental conductance tracking, use the Ipv-Vpv curve as the tracking standard, and thus the system can very quickly reach the MPP C (i.e. $\Delta I/\Delta V=-I/V$), corresponding to the MPP C' (i.e. $dP/dV=0$). This technique can not only improve the slow tracking speed of the incremental conductance method, but also ensure the accuracy of the MPPT, and increase the efficiency of the MPPT. FIGS. 2(a)-2(b) respectively show the waveform diagrams of the various tracking routes of the PI-INC MPPT method proposed by the present invention and the INC MPPT method when it is fallen on the right-hand side and the left-hand side of the MPP. As shown in FIG. 2(a), when the PI-INC MPPT method proposed by the present invention is used, and it is fallen on the right-hand side of the MPP, the Ppv-Vpv curve is used to track firstly, and then the Ipv-Vpv curve is used when the range of ($\rho 1$, $\rho 2$) is entered. As shown in FIG. 2(b), when the PI-INC MPPT method proposed by the present invention is used, and it is fallen on the left-hand side of the MPP, the Ppv-Vpv curve is used to track firstly, and then the Ipv-Vpv curve is used when the range of ($\rho 1$, $\rho 2$) is entered. As for the INC MPPT method, it uses the Ipv-Vpv curve to track no matter where it falls on.

Figure 1A:
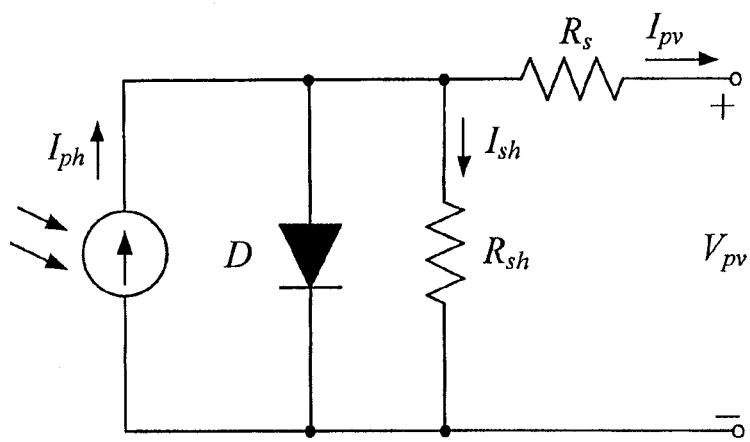
FIG. 1(a) shows a circuit diagram of an equivalent circuit of a typical solar cell unit.

According to FIG. 1(a), the typical $I_{pv}$-$V_{pv}$, relationship of a practical photovoltaic cell, neglecting $R_{sh}$, can be described by $$I_{pv} = I_{ph} - I_{pvo}\left\{\exp\left[\frac{q}{AkT}(V_{pv} + I_{pv}R_s)\right] - 1\right\} \tag{1'}$$

and $$V_{pv} = \frac{AkT}{q}\ln\left(\frac{I_{ph} - I_{pv} + I_{pvo}}{I_{pvo}}\right) - I_{pv}R_s \tag{2}$$

and $$\frac{dI_{pv}}{dV_{pv}} = -\frac{q}{AkT}I_{pvo}e^{\frac{q}{AkT}(V_{pv}+I_{pv}R_s)}\left(1 + \frac{q}{AkT}R_s I_{pvo}e^{\frac{q}{AkT}(V_{pv}+I_{pv}R_s)}\right)^{-1} \tag{3}$$

where $I_{ph}$ denotes light-generated current, $I_{pvo}$ is dark saturation current, $I_{pv}$ is PV electric current, $V_{pv}$ is PV voltage, $R_s$ is series resistance, A is the non-ideality factor, k is Boltzmann's constant, T is temperature, and q is the electronic charge. The output power from the PV cell can be given by $$P_{pv} = V_{pv}I_{pv} \tag{4}$$
$$= I_{pv}\left\{\frac{AkT}{q}\ln\left(\frac{I_{ph} - I_{pv} + I_{pvo}}{I_{pvo}}\right) - I_{pv}R_s\right\}$$

and $$\frac{dP_{pv}}{dV_{pv}} = I_{pv} + V_{pv} \cdot \frac{dI_{pv}}{dV_{pv}} \tag{5}$$

The MPP in the PV array occurs when $$\frac{dP_{pv}}{dV_{pv}} = 0 \tag{6}$$

The criteria for the INC MPPT at MPP can then be given from (6), $$\frac{dI_{pv}}{dV_{pv}} = -\frac{I_{pv}}{V_{pv}} \tag{7}$$

Referring to FIG. 1(b), $dP_{pv}/dV_{pv}=0$ on the Ppv-Vpv curve is equal to MPP of $dI_{pv}/dV_{pv}=-I_{pv}/V_{pv}$ on the ipv-vpv curve. In difference expression, (7) becomes $$\frac{\Delta I_{pv}}{\Delta V_{pv}} \approx \frac{dI_{pv}}{dV_{pv}} = -\frac{I_{pv}}{V_{pv}} \tag{8}$$

and (8) can also be represented by $$\Delta I_{pv}V_{pv} + \Delta V_{pv}I_{pv} = 0 \tag{9}$$

From $\Delta C$ as shown via the $I_{pv}$-$V_{pv}$ curve, the boundaries of the proposed INC MPPT method are, $$-\rho_1 \frac{I_{pv}}{V_{pv}} > \Delta C > -\rho_2 \frac{I_{pv}}{V_{pv}} \tag{10}$$

for INC tracking along the $I_{pv}$-$V_{pv}$ curve in CTZ (or TTZ), and $$\Delta C > -\rho_1 \frac{I_{pv}}{V_{pv}} \tag{11}$$

or $$\Delta C < -\rho_2 \frac{I_{pv}}{V_{pv}} \tag{12}$$

for the PI tracking along the $P_{pv}$-$V_{pv}$ curve beyond the CTZ (or TTZ), but in the sense of INC MPPT, it is for INC tracking along the $I_{pv}$-$V_{pv}$ curve, where the $\Delta C$ is defined as $$\Delta C = \frac{\Delta I_{pv}}{\Delta V_{pv}} \tag{13}$$

where the two ratios $\rho_1$ and $\rho_2$ are real numbers and let $\rho_m=1$ at MPP. Equation (13) is negative because the signs of $\Delta I_{pv}$ and $\Delta V_{pv}$ are always opposite. Accordingly, from (8) and (10), $$-\rho_1 > \frac{\Delta I_{pv}V_{pv}}{\Delta V_{pv}I_{pv}} > -\rho_2 \tag{14}$$

From (5), by difference approach, $$dP_{pv} \approx \Delta P_{pv} \tag{15}$$
$$= V_{pv}\Delta I_{pv} + I_{pv}\Delta V_{pv}$$

All increments in (15) are defined as follows.

$$\Delta P = P_{n+1} - P_n \tag{16}$$

$$\Delta V = V_{n+1} - V_n \tag{17}$$

and $$\Delta I = I_{n+1} - I_n \tag{18}$$

where all subscripts pv are omitted for simplicity in analysis, such that $\Delta P = \Delta P_{pv}$, $\Delta V = \Delta V_{pv}$, and $\Delta I = A\Delta I_{pv}$. Related to the definition of the CTZ in (10), a corresponding PTZ is equivalently defined by $$P_{\rho 1} > \Delta P > P_{\rho 2} \tag{19}$$

for PI-INC MPPT in PTZ (or TTZ), which uses INC tracking toward MPP along the $I_{pv}$-$V_{pv}$ curve, and $$\Delta P > P_{\rho 1} \tag{20}$$

or $$\Delta P < P_{\rho 2} \tag{21}$$

for PI-INC MPPT excluding the PTZ (or TTZ), which uses the PI tracking toward either point $P_{\rho 1}$ or $P_{\rho 2}$ along the $P_{pv}$-$V_{pv}$ curve. Subsequently, by adding one to all terms in (14) yields $$1 - \rho_1 > \frac{\Delta I V_{n+1}}{\Delta V I_{n+1}} + 1 > 1 - \rho_2 \tag{22}$$

and $$(1 - \rho_1)\Delta V I_{n+1} > \Delta P > (1 - \rho_2)\Delta V I_{n+1} \tag{23}$$

where $\Delta V$ and $\Delta I$ have opposite signs and $\rho_2 > \rho_m > \rho_1$ with $\rho_m = 1$. The two power threshold limits in (23) are then defined by $$P_{\rho 1} \equiv (1 - \rho_1)\Delta V I_{n+1} \tag{24}$$

and $$P_{\rho 2} \equiv (1 - \rho_2)\Delta V I_{n+1} \tag{25}$$

If $1 - \rho_2 = -(1 - \rho_1)$ is adopted for example, then the values of (24) and (25) are equal and yield $$P_{\rho 2} = -P_{\rho 1} \tag{26}$$

and from (19), $$P_{\rho 1} > \Delta P > -P_{\rho 1} \tag{27}$$

A summary of the tracking of PI-INC MPPT is briefly described as follows:

Case I: Tracking in TTZ zone: the priority measure for guiding judgment is $\Delta C$ in (10) and the minor for monitoring is $\Delta P$ in (19).

(1) The PI-INC MPPT guides the PV converter using INC tracking along the $I_{pv}$-$V_{pv}$ curve toward MPP.

(2) Once $\Delta C = -I_{n+1}/V_{n+1}$, corresponding to $\Delta P = 0$, the system will exactly operate at MPP that is kept by the PI-INC MPPT using INC tracking along the $I_{pv}$-$V_{pv}$ curve.

Case II: Tracking beyond the TTZ zone: the priority measure for guiding judgment is $\Delta P$ in (19) and the minor for monitoring is $\Delta C$ in (10).

(1) If $\Delta P \neq 0$ but $\Delta P > P_{\rho 1}$ in (20), in the left-hand side of TTZ, the PI-INC MPPT guides the PV converter using PI tracking along the $P_{pv}$-$V_{pv}$ curve toward point $P_{\rho 1}$.

(2) If $\Delta P \neq 0$ but $\Delta P < P_{\rho 2}$ in (21), in the right-hand side of TTZ, the PI-INC MPPT guides the PV converter using PI tracking along the $P_{pv}$-$V_{pv}$ curve toward point $P_{\rho 2}$.

Figure 3A:
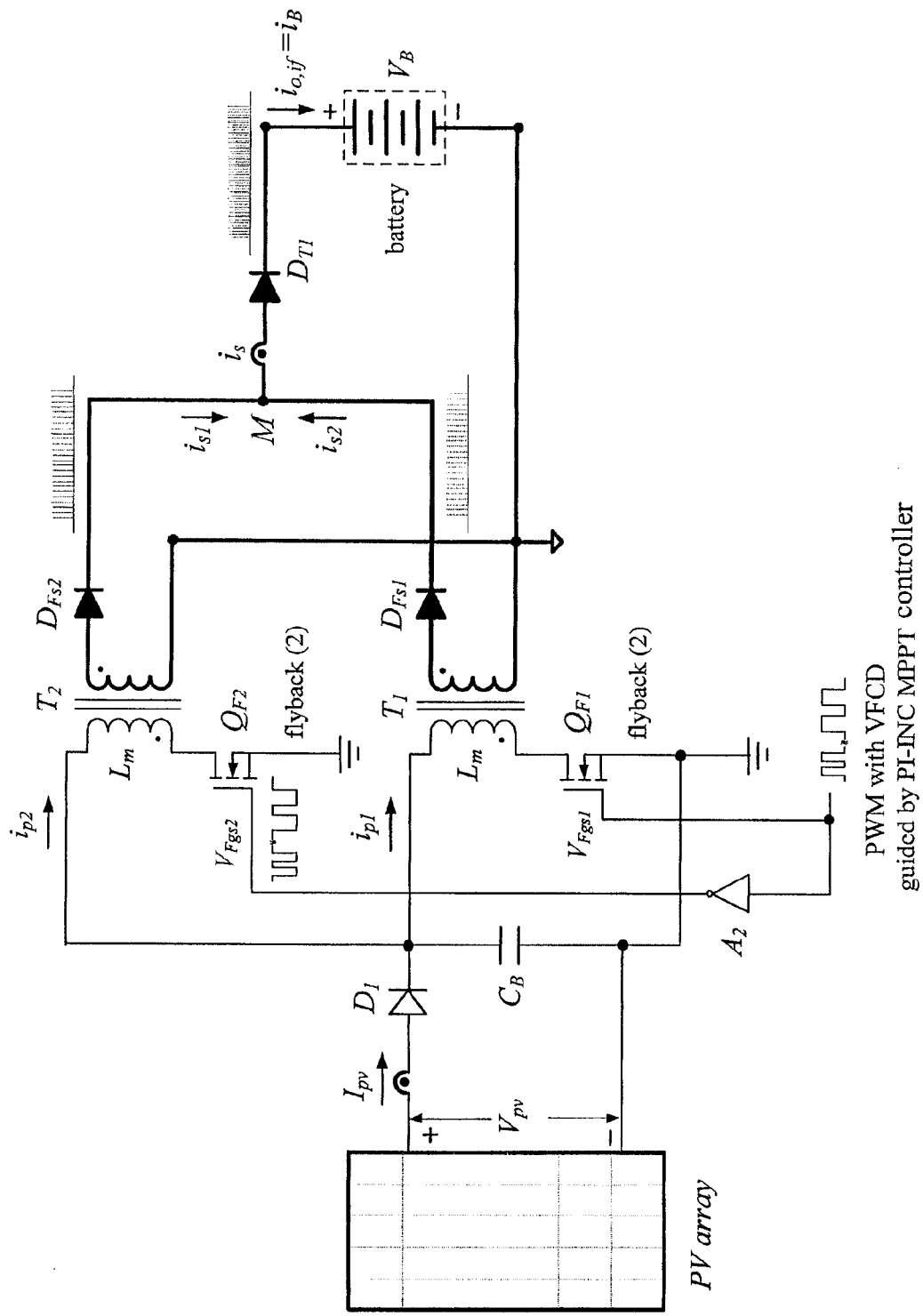
FIG. 3(a) shows a circuit diagram of a photovoltaic charger according to the preferred embodiment of the present invention.
Figure 4:
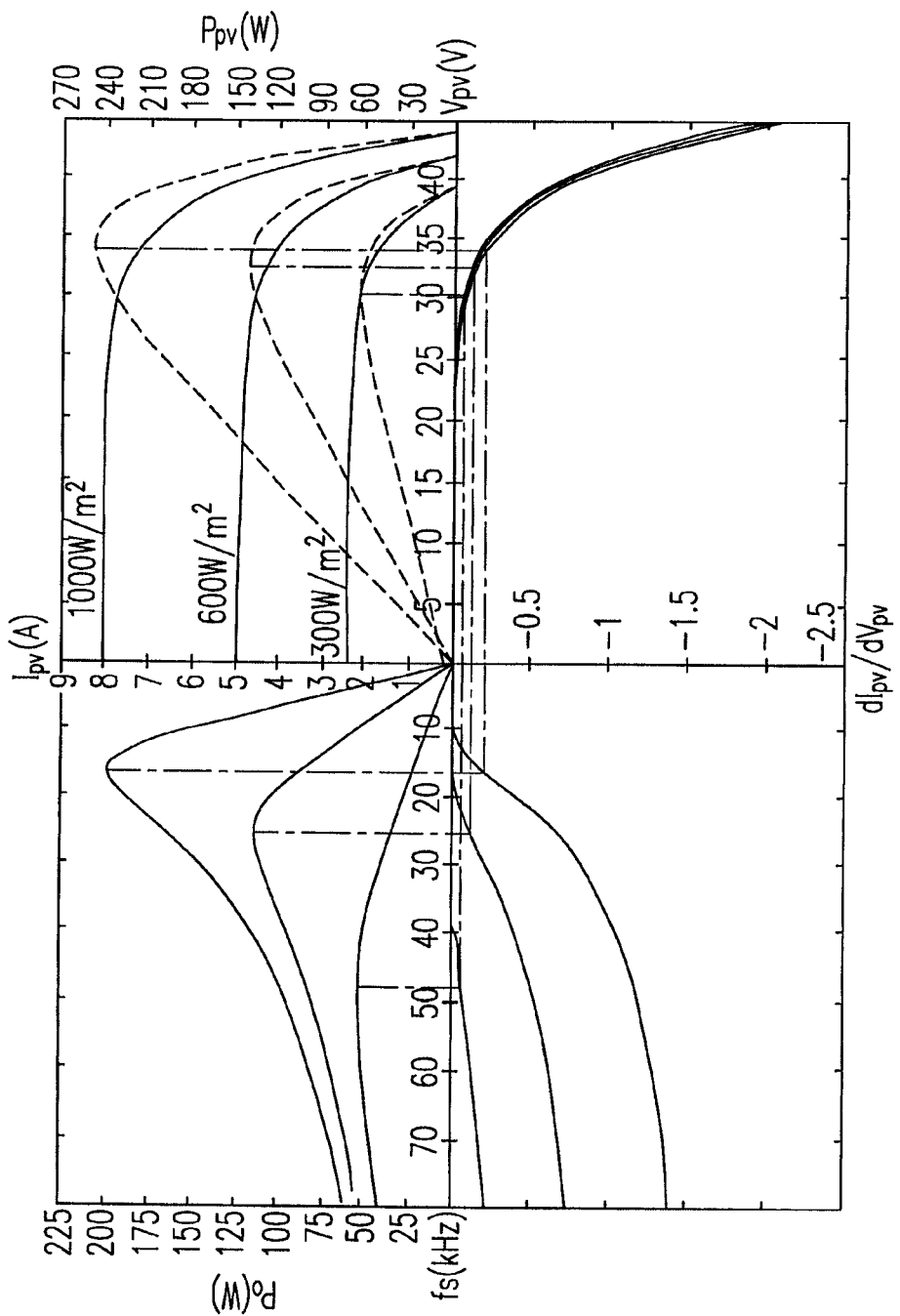
FIG. 4 shows a waveform diagram of control chart of the controller of the photovoltaic charger according to the preferred embodiment of the present invention.

As shown in FIG. 3(a), it depicts a photovoltaic system according to the preferred embodiment of the present invention, being a charger and including a PI-INC MPPT controller (not shown, and only its output signal being indicated as a PWM with VFCD guided by the PI-INC MPPT controller), and the controller uses a variable-frequency constant-duty (VFCD) control, and is guided by a control chart, wherein the control chart includes an Ipv-Vpv curve and a Ppv-Vpv curve, a dIpv/dVpv-Vpv curve, a dIpv/dVpv-fs curve, and a Po-fs curve (the above-mentioned curves are shown in FIG. 4). Besides, the photovoltaic system further includes a PV array, an interleaved flyback converter, a battery, diodes D1 and DT1, capacitor CB and inverter A2. The interleaved flyback converter is electrically connected to the PV array, and the battery is electrically connected to the interleaved flyback converter. The interleaved flyback converter includes a first flyback converter (flyback(1), having switch QF1, transformer T1 and diode DFs1) and a second flyback converter (flyback(2), having switch QF2, transformer T2 and diode DFs2), the first flyback converter is electrically connected to the second flyback converter in parallel, and the first and the second flyback converters receive a pulse-width modulation signal (i.e. the PWM with VFCD) from the PI-INC controller so as to cause the system to engage in an MPPT.

Figure 3B:
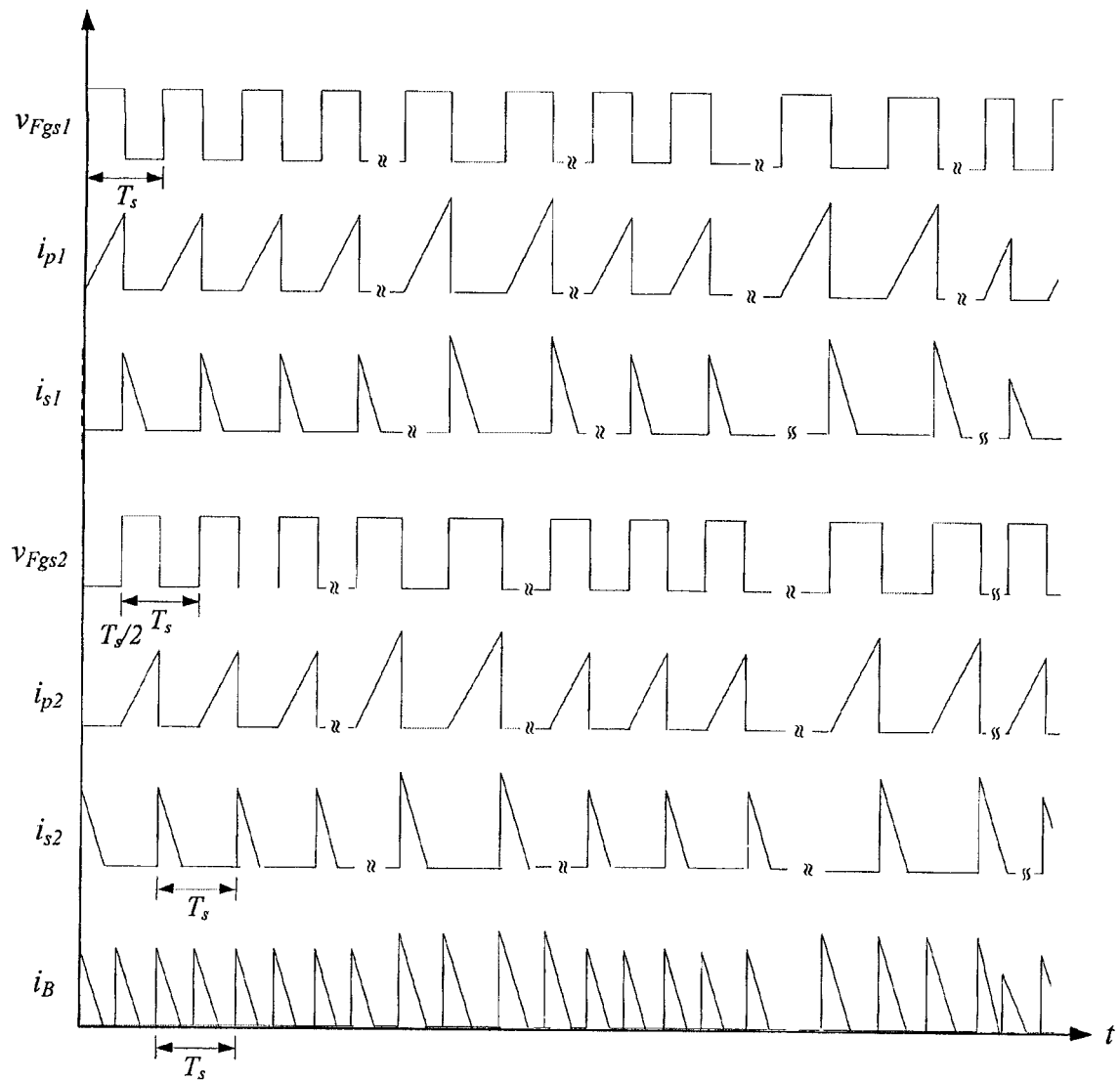
FIG. 3(b) shows a waveform diagram of predicted dynamic states with insolation change of the photovoltaic charger as shown in FIG. 3(a)
Figure 3C:
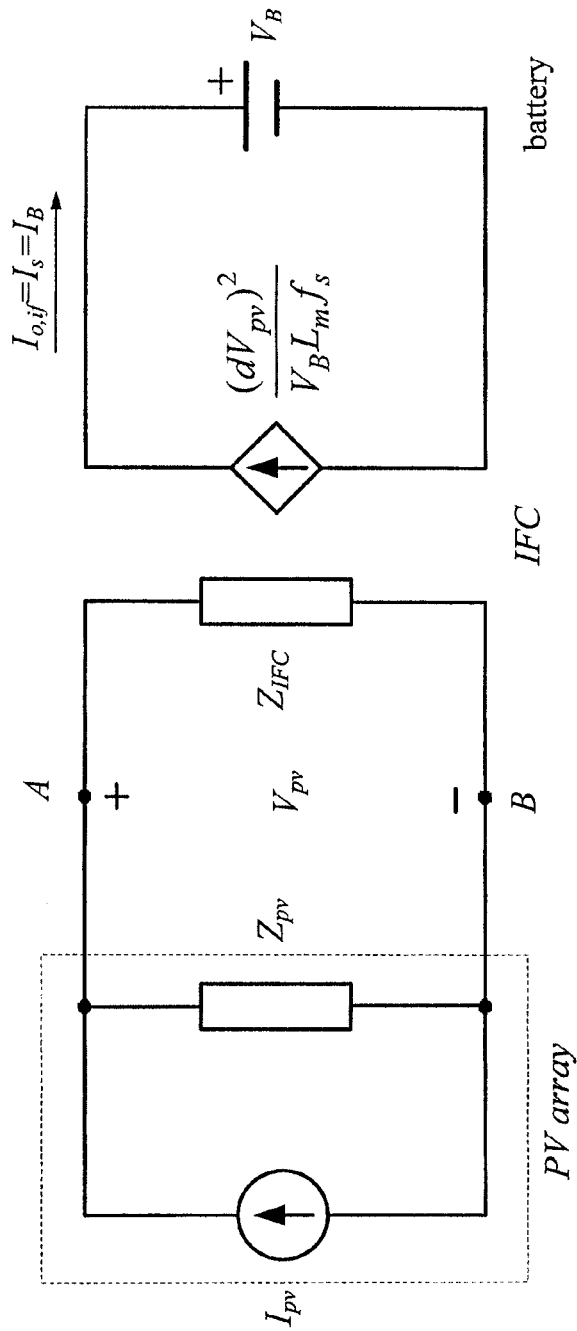
FIG. 3(c) shows an equivalent circuit diagram of the control-to-output model drawing energy from the PV array of the photovoltaic charger as shown in FIG. 3(a)

In FIG. 3(a), the inner resistance $r_{Lm}$ of the transformer is neglected and all parameters of the two flyback converters are presumed the same to facilitate analysis. The predicted dynamic-state waveforms of the IFC are shown in FIG. 3(b), in which the primary currents, $i_{p1}$ and $i_{p2}$, that are interleaved pumping from the PV array, and the secondary currents, $i_{s1}$ and $i_{s2}$, that are to be synthesized at node M as $i_s = i_{o,if} = i_B$ for charging the battery (it is a lead-acid battery (LAB)). To suit the interleaved operation, both two flyback converters are designed to operate between discontinuous-continuous conduction mode (DCM) and boundary conduction mode (BCM) so that the pulse charge can prevent the sulfating crystallization from covering the positive electrode of LAB, prolonging the battery life. However, only the IFC in BCM is analyzed for convenience. An equivalent half-circuit of the IFC is shown in FIG. 3(c). In FIG. 3(a), the peak primary current $\hat{i}_{p1} = \hat{i}_{pv1}$ of the flyback converter (I) from the PV array can be given by $$\hat{i}_{pv1} = \frac{V_{pv}}{L_m} t_{on} \tag{28}$$

The average primary current $I_{pv1}$ in each drawing period $T_s$ is equal to that $I_{pv2}$ for flyback converter (II), $$I_{pv1} = \frac{V_{pv} d^2}{2 L_m f_s} \tag{29}$$
$$= I_{pv2}$$

where d is duty cycle, $L_m$ is magnetizing inductance, and $f_s$ is switching frequency (or control frequency). For convenience in analysis and synthesis of the pulse train for charger, the instantaneous primary currents $i_{p1}$ and $i_{p2}$ of IFC from PV array are then defined as $$i_{p1} = \begin{cases} \dfrac{V_{pv}}{L_m} & 0 < t < dT_s \\ 0 & dT_s < t < T_s \end{cases} \tag{30}$$

And $$i_{p2} = \begin{cases} \dfrac{V_{pv}}{L_m}\left(t - \dfrac{T_s}{2}\right) & \dfrac{T_s}{2} < t < \left(\dfrac{T_s}{2} + dT_s\right) \\ 0 & \text{Otherwise} \end{cases} \tag{31}$$

We then have total average PV current $I_{pv}$ that is drawn by IFC, from (29), $$I_{pv} = \frac{V_{pv}d^2}{L_m f_s} \quad (32)$$

If power efficiency η is considered, the relation of output power $P_o$ and input power $P_{pv}$ with a load of battery $V_B$ can be expressed as $$\eta I_{pv} V_{pv} = I_{o,if} V_B = I_s V_B \quad (33)$$

Where $V_o = V_B$, $P_o = I_{o,if} V_B = I_s V_B$ and $P_{pv} = I_{pv} V_{pv}$.

From (29), the two average secondary (output) currents before synthesis can then be given by $$I_{s1} = I_{s2} \quad (34)$$
$$= \frac{\eta(V_{pv}d)^2}{2V_B L_m f_s}$$

After the synthesis of $I_{s1}$ and $I_{s2}$ at node M, the output current $I_{o,if} = I_s = I_B$ can be expressed as $$I_{o,if} = I_s \quad (35)$$
$$= I_{s1} + I_{s2}$$
$$= I_B$$
$$= \frac{\eta(V_{pv}d)^2}{V_B L_m f_s}$$

and the output power versus switching frequency will be $$P_{o,if} = I_B V_B \quad (36)$$
$$= \frac{\eta(V_{pv}d)^2}{L_m f_s}$$

Formula (36) is put into the control chart as shown in FIG. 4 to be a design reference. From (33), we then have control-to-output transfer function of IFC given by $$\frac{I_{o,if}}{f_s^{-1}} = \frac{\eta(V_{pv}d)^2}{V_B L_m} \quad (37)$$

In summary, the input impedance $Z_{IF}$ of IFC should be conjugated to the impedance $Z_{pv}$ of the PV array for maximum power transfer, that is, $$Z_{IF} = \overline{Z}_{pv} \quad (38)$$
where
$$Z_{IF} = j2\pi f_s L_m \quad (39)$$
And
$$Z_{pv} = \frac{1}{j2\pi f_s C_{pv}} \quad (40)$$

It is feasible for the PI-INC MPPT to guide the IFC drawing energy from the PV array under impedance matching with (38) and (39). If the internal resistances between the PV array and the IFC are neglected for convenience, we then have the design reference, at maximum power transfer, $$L_m C_{pv} = \left(\frac{1}{2\pi f_s}\right)^2 \quad (41)$$

Figure 5A:
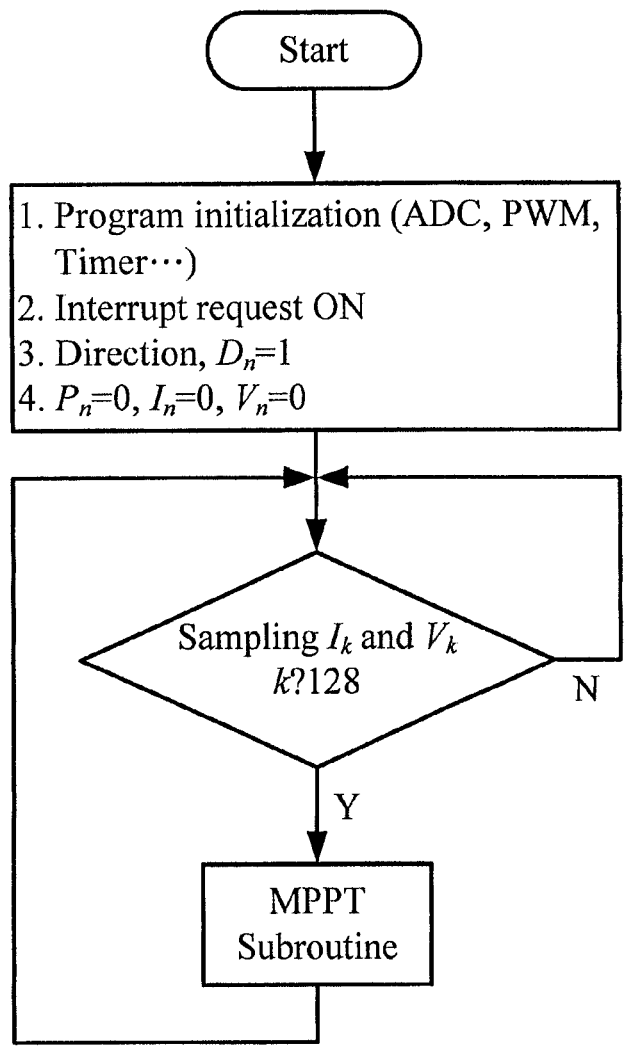
FIG. 5(a) shows a flow chart of main program of an algorithm of PI-INC MPPT using VFCD according to the preferred embodiment of the present invention.
Figure 5B:
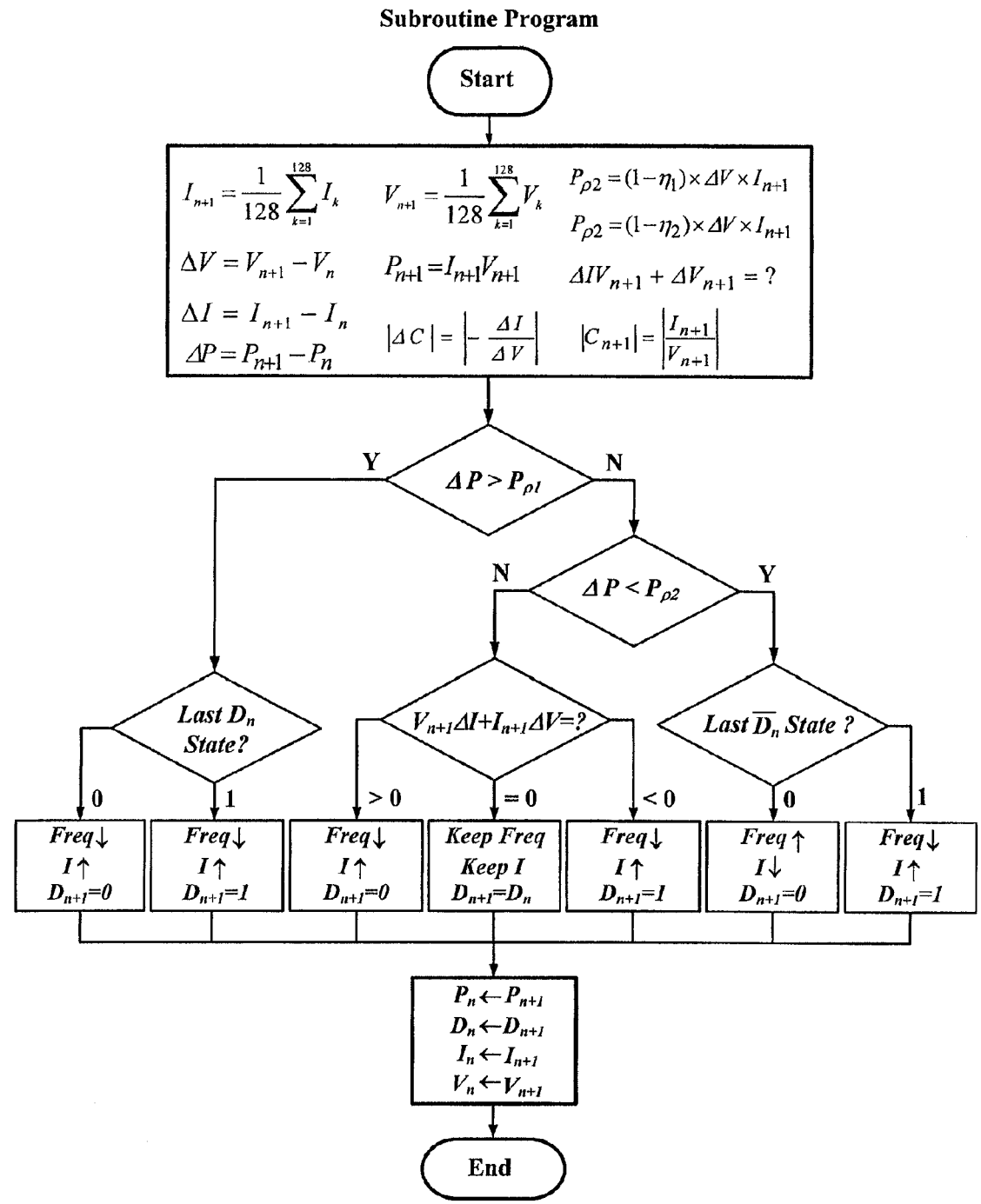
FIG. 5(b) shows a flow chart of subroutine of an algorithm of PI-INC MPPT using VFCD according to the preferred embodiment of the present invention.

An algorithm of PI-INC MPPT using VFCD is depicted in FIGS. 5(a)-(b). The algorithm is programmed according to the derived formulas (10) and (19), and refers to the control chart as shown in FIG. 4. The outlines of the algorithm are listed in FIGS. 5(a)-(b). In FIG. 5(a), the main program samples the instantaneous information come from the PV array as the new data to be used in the subroutine of FIG. 5(b). The subroutine uses the data from the main program to calculate the instantaneous PV voltage, current and power firstly, and then uses the standards in formulas (10) and (19) to execute the PI-INC MPPT. The main program provides a direction Dn at the very beginning, it is 1 or 0, to change the frequency so as to decrease or increase the PV current respectively. Thus, at the very beginning, a PI fine adjustment or an INC coarse adjustment towards the MPP is engaged in. In this algorithm, a power difference comparison is accomplished by referring to formula (19) and compared with Pρ1 of formula (24) and Pρ2 of formula (25). In other words, via the two power inequalities (20) and (21), the direction of tracking is quite easy to be determined.

Design and Experiment

Figure 6A:
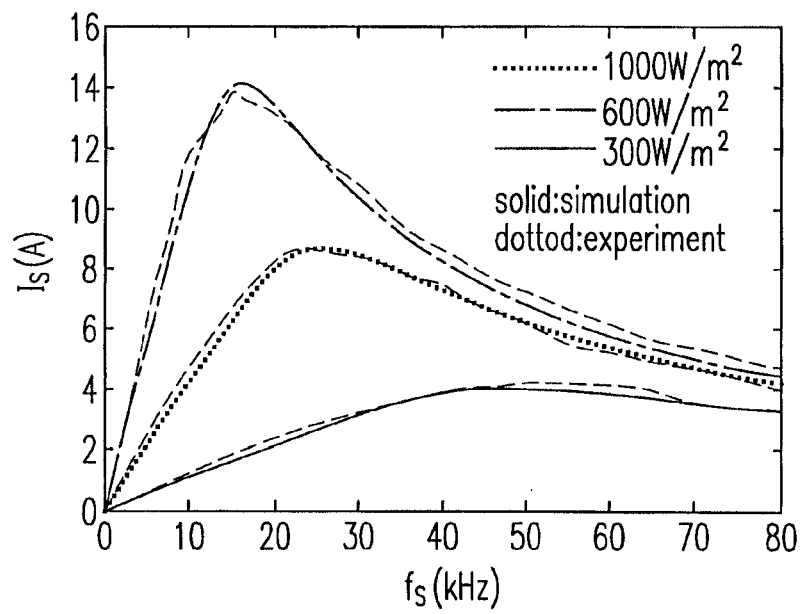
FIGS. 6(a)-(b) respectively show a waveform diagram of output current versus switching frequency and output power versus switching frequency under various solar insolations of the proposed photovoltaic charger using VFCD.
Figure 6B:
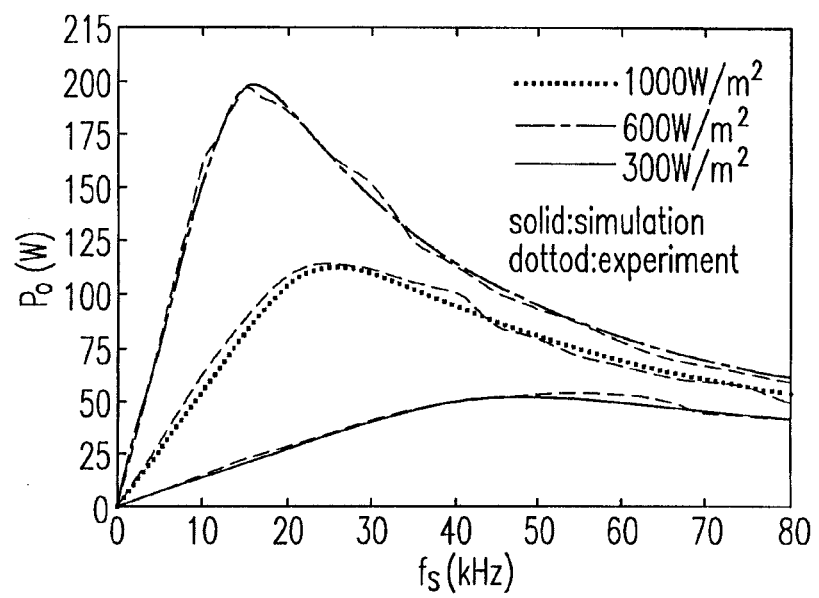

The algorithm of PI-INC MPPT is executed by Microchip dsPIC33FJ06GS202 according to the guided flowchart in FIGS. 5(a)-(b). Besides, an experimental setup with two PV arrays in series with a maximum power of 250 W, and one LAB has a specification of 45 AH, is established with the circuit structure as shown in FIG. 3(a). The charger is specified to charge with a positive peak current pulse of 24 A for IFC to battery. The interleaved frequency $f_s$ of the IFCs for drawing energy with a duty ratio of 0.26 from the PV array is set to 14.6 kHz (which is the frequency at the MPP under solar insolation of 1 kW/m²). FIGS. 6(a)-(b) respectively show the reactions of IFC using the VFCD control, wherein FIG. 6(a) shows the waveform of output current versus switching frequency, and FIG. 6(b) shows the waveform of output power versus switching frequency, in which the solid line shows the results of the simulation, and the dotted line shows the results of the experiment (including three solar insolation, 300 W/m², 600 W/m², and 1 kW/m²). In FIGS. 6(a)-(b), the results of simulation are quite close to the results of the experimental measurement. Thus, the tracking chart (see FIG. 4) of PI-INC MPPT is useful in guiding practical design.

Figure 7A:
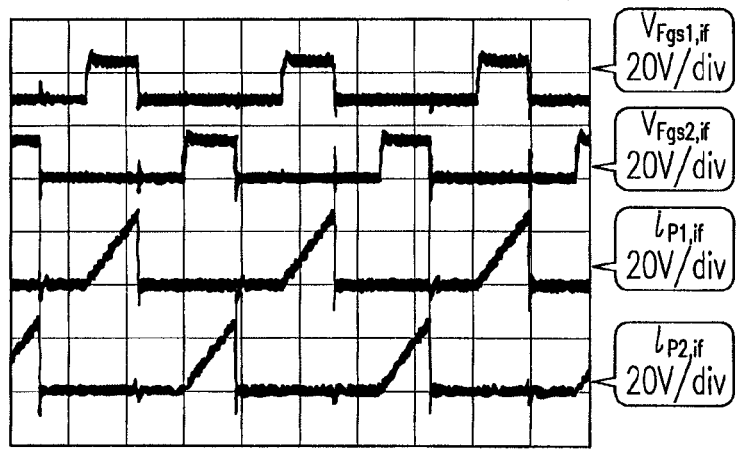
FIGS. 7(a)-(b) respectively show the interleaved high frequency tiny pulse currents (ip1, ip2) and the interleaved secondary side currents (is1, is2) under the sun insolation of 1 $Kw/m^2$.
Figure 7B:
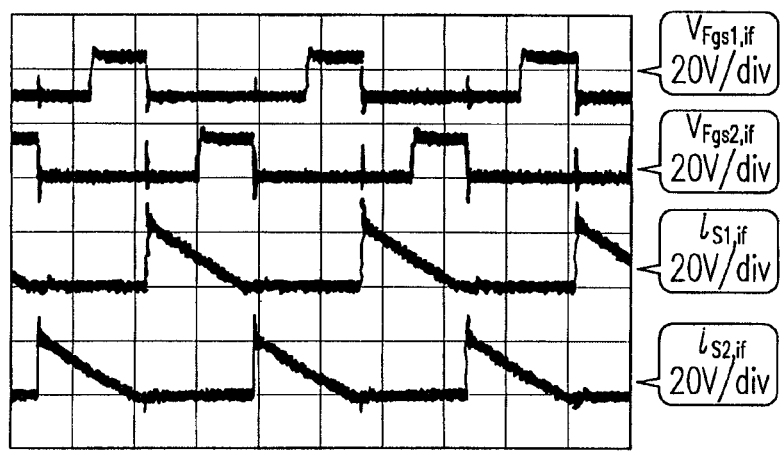

FIGS. 7(a)-(b) respectively show the interleaved high frequency tiny pulse currents (ip1, ip2) and the interleaved secondary side currents (is1, is2) under the sun insolation of 1 Kw/m². All the peak values currents are approximately 24 A, wherein the measured waveforms are the same as those predicted by FIG. 3(b).

Figure 8:
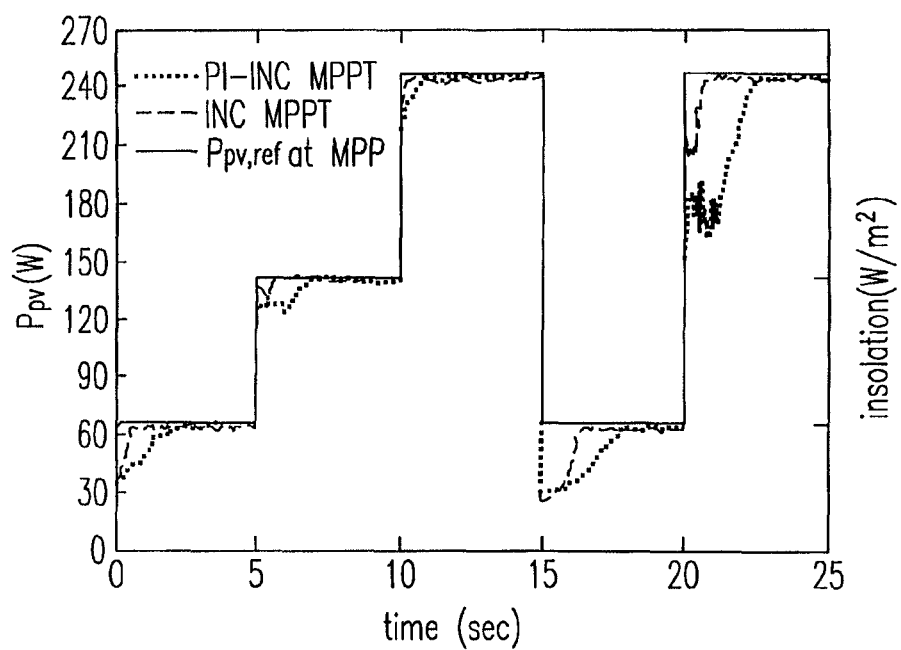
FIG. 8 shows waveform diagram comparing PI-INC MPPT and INC-MPPT in terms of dynamic tracking behavior for various insolation changes.

FIG. 8 compares PI-INC MPPT and INC-MPPT in terms of dynamic tracking behavior for various insolation changes, in which the tracking time responses to MPP are estimated for five kinds of scenarios of insolation change. This comparison reveals that PI-INC MPPT has a faster tracking performance than that of INC MPPT over 3-4 times during a large change in insolation.

Embodiments

1. A photovoltaic system with a photovoltaic current (Ipv), a photovoltaic voltage (Vpv), a photovoltaic power (Ppv), a control frequency (fs) and an output power (Po), wherein there is a derivative (dIpv/dVpv) of Ipv with respect to Vpv, comprising:
 a power-increment-aided incremental-conductance (PI-INC) maximum power point tracking (MPPT) controller guided by a control chart, wherein the control chart includes:
 an Ipv-Vpv curve and a Ppv-Vpv curve;
 a dIpv/dVpv-Vpv curve;
 a dIpv/dVpv-fs curve; and
 a Po-fs curve.

2. A system according to Embodiment 1, wherein the PI-INC MPPT controller uses a variable frequency constant duty control.

3. A system according to Embodiment 2 or 3, wherein the system is one selected from a group consisting of a photovoltaic charger, a photovoltaic DC link converter and a photovoltaic inverter.

4. A system according to anyone of the above-mentioned Embodiments being the photovoltaic charger and further comprising a photovoltaic (PV) array, an interleaved flyback converter and a battery, wherein the interleaved flyback converter is electrically connected to the PV array, the battery is electrically connected to the interleaved flyback converter, the interleaved flyback converter includes a first flyback converter and a second flyback converter, the first flyback converter is electrically connected to the second flyback converter in parallel, and the first and the second flyback converters receive a pulse-width modulation signal from the PI-INC MPPT controller to cause the system to perform an MPPT.

5. A system according to anyone of the above-mentioned embodiments, wherein when a specific conductance derivative ratio on the Ipv-Vpv curve is located in a threshold tracking zone having a minimum value larger than a first conductance derivative ratio, and a maximum value smaller than a second conductance derivative ratio, the controller uses the Ipv-Vpv curve to perform an INC fine tracking, when the specific conductance derivative ratio is located outside the threshold tracking zone, the controller uses the Ppv-Vpv curve to perform an PI coarse tracking, and when the first conductance derivative ratio is ρ1 and the second conductance derivative ratio is ρ2, $$-\rho_1 > \frac{\Delta I_{pv} V_{pv}}{\Delta V_{pv} I_{pv}} > -\rho_2,$$

where Vpv is an output voltage of the PV array, Ipv is an output current of the PV array, ΔIpv is a change of the Ipv, and ΔVpv is a change of the Vpv.

6. A photovoltaic system with a photovoltaic current (Ipv), a photovoltaic voltage (Vpv) and a photovoltaic power (Ppv), comprising:
 a controller having circuit characteristics represented by an Ipv-Vpv curve and a Ppv-Vpv curve.

7. A photovoltaic system according to Embodiment 6 further comprising a control frequency (fs) and an output power (Po), wherein there is a derivative (dIpv/dVpv) of Ipv with respect to Vpv, the circuit characteristics are further represented by a dIpv/dVpv-Vpv curve, a dIpv/dVpv-fs curve, and a Po-fs curve.

8. A photovoltaic system according to Embodiment 6 or 7, wherein the controller is guided by the circuit characteristics such that the photovoltaic system is engaged in an MPPT.

9. A system according to anyone of the above-mentioned Embodiment, wherein the system is one selected from a group consisting of a photovoltaic charger, a photovoltaic DC link converter and a photovoltaic inverter.

10. A system according to anyone of the above-mentioned embodiments being the photovoltaic charger and further comprising a photovoltaic (PV) array, an interleaved flyback converter and a battery, the interleaved flyback converter is electrically connected to the PV array, the battery is electrically connected to the interleaved flyback converter, the interleaved flyback converter includes a first flyback converter and a second flyback converter, the first flyback converter is electrically connected to the second flyback converter in parallel, and the first and the second flyback converters receive a pulse-width modulation signal from the PI-INC MPPT controller to cause the system to engage in an MPPT.

11. A system according to anyone of the above-mentioned embodiments, wherein when a specific conductance derivative ratio on the Ipv-Vpv curve is located in a threshold tracking zone having a minimum value larger than a first conductance derivative ratio, and a maximum value smaller than a second conductance derivative ratio, the controller uses the Ipv-Vpv curve to engage in an INC fine tracking, when the specific conductance derivative ratio is located outside the threshold tracking zone, the controller uses the Ppv-Vpv curve to engage in a PI coarse tracking, and when the first conductance derivative ratio is ρ1 and the second conductance derivative ratio is ρ2, $$-\rho_1 > \frac{\Delta I_{pv} V_{pv}}{\Delta V_{pv} I_{pv}} > -\rho_2,$$

where Vpv is an output voltage of the PV array, Ipv is an output current of the PV array, ΔIpv is a change of the Ipv, and ΔVpv is a change of the Vpv.

12. A method for operating a controller of a photovoltaic system with a photovoltaic current (Ipv), a photovoltaic voltage (Vpv) and a photovoltaic power (Ppv), comprising a step of: providing a Ipv-Vpv curve and a Ppv-Vpv curve to be used to determine whether a specific conductance derivative ratio of dIpv/dVpv enters a threshold tracking zone.

13. A method according to anyone of the above-mentioned embodiments, wherein the threshold tracking zone having a minimum value larger than a first conductance derivative ratio, and a maximum value smaller than a second conductance derivative ratio, the Ipv-Vpv curve, the Ppv-Vpv curve and the threshold tracking zone are provided to guide the controller, the method further comprising a step of: a) causing the controller to use a variable-frequency constant-duty control to engage in an MPPT.

14. A method according to Embodiment 12 or 13 further comprising a step of: b) causing the controller to use the Ipv-Vpv curve to engage in an INC fine tracking when the specific conductance derivative ratio on the Ipv-Vpv curve is located in the threshold tracking zone.

15. A method according to anyone of the above-mentioned Embodiments further comprising a step of: c) causing the controller to use the Ppv-Vpv curve to engage in a PI coarse tracking when the specific conductance derivative ratio is located outside the threshold tracking zone.

16. A method according to Embodiment 14 or 15, wherein the photovoltaic system further comprises a photovoltaic (PV) array, and when the first conductance derivative ratio is ρ1 and the second conductance derivative ratio is ρ2, $$-\rho_1 > \frac{\Delta I_{pv} V_{pv}}{\Delta V_{pv} I_{pv}} > -\rho_2,$$

where Vpv is an output voltage of the PV array, Ipv is an output current of the PV array, ΔIpv is a change of the output current of the PV array Ipv, and ΔVpv is a change of the output voltage Vpv of the PV array.

17. A method according to anyone of the above-mentioned embodiments, wherein the step b) further comprises sub-steps of:

when the specific conductance derivative ratio is smaller than β1, causing the Vpv to increase a positive value of ΔVpv via the controller so as to get a change ΔPpv of an output power Ppv of the PV array via the Ppv-Vpv curve and to stop when ΔPpv/ΔVpv≈dPpv/dVpv=0, where dPpv/dVpv is a derivative of Ppv with respect to Vpv;

when the specific conductance derivative ratio is larger than ρ2, causing the Vpv to decrease the positive value of ΔVpv via the controller so as to get the change ΔPpv of the output power Ppv of the PV array via the Ppv-Vpv curve and to stop when ΔPpv/ΔVpv≈dPpv/dVpv=0;

when ρ1≤the conductance derivative ratio≤ρ2 and ΔIpv/ΔVpv>−Ipv/Vpv, causing the Vpv to increase the positive value of ΔVpv via the controller so as to get a change ΔIpv of the output current Ipv of the PV array via the Ipv-Vpv curve and to stop when ΔIpv/ΔVpv=−Ipv/Vpv; and when ρ1≤the conductance derivative ratio≤ρ2 and ΔIpv/ΔVpv<−Ipv/Vpv, causing the Vpv to decrease the positive value of ΔVpv via the controller so as to get the change ΔIpv of the output current Ipv of the PV array via the Ipv-Vpv curve and to stop when ΔIpv/ΔVpv=−Ipv/Vpv.

According to the aforementioned descriptions, the present invention provides a photovoltaic system having a power-increment-aided incremental-conductance maximum power point tracking controller using a variable-frequency constant-duty control. This technique includes PI-MPPT and INC-MPPT, and sets up a threshold tracking zone in the area with obvious changes on the Ipv-Vpv curve around point C. If the power increment falls into the threshold tracking zone, the system enters the INC fine tracking and uses the Ipv-Vpv curve as a tracking standard. On the contrary, if the power increment falls outside the threshold tracking zone, the system enters the PI coarse tracking and uses the Ppv-Vpv curve as a tracking standard. The proposed photovoltaic system has a relatively quick response and a relatively better output efficiency of the maximum power when engaged in the MPPT so as to possess the non-obviousness and the novelty.

While the present invention has been described in terms of what are presently considered to be the most practical and preferred embodiments, it is to be understood that the present invention need not be restricted to the disclosed embodiments. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A photovoltaic system with a photovoltaic current (Ipv), a photovoltaic voltage (Vpv), a photovoltaic power (Ppv), a control frequency (fs) and an output power (Po), wherein there is a derivative (dIpv/dVpv) of Ipv with respect to Vpv, comprising:

a power-increment-aided incremental-conductance (PI-INC) maximum power point tracking (MPPT) controller guided by a control chart, wherein the control chart includes:
an Ipv-Vpv curve and a Ppv-Vpv curve;
a dIpv/dVpv-Vpv curve;
a dIpv/dVpv-fs curve; and
and a Po-fs curve.

2. A system according to claim 1, wherein the PI-INC MPPT controller uses a variable frequency constant duty control.

3. A system according to claim 1, wherein the system is one selected from a group consisting of a photovoltaic charger, a photovoltaic DC link converter and a photovoltaic inverter.

4. A system according to claim 3 being the photovoltaic charger and further comprising a photovoltaic (PV) array, an interleaved flyback converter and a battery, wherein the interleaved flyback converter is electrically connected to the PV array, the battery is electrically connected to the interleaved flyback converter, the interleaved flyback converter includes a first flyback converter and a second flyback converter, the first flyback converter is electrically connected to the second flyback converter in parallel, and the first and the second flyback converters receive a pulse-width modulation signal from the PI-INC MPPT controller to cause the system to perform an MPPT.

5. A system according to claim 4, wherein when a specific conductance derivative ratio on the Ipv-Vpv curve is located in a threshold tracking zone having a minimum value larger than a first conductance derivative ratio, and a maximum value smaller than a second conductance derivative ratio, the controller uses the Ipv-Vpv curve to perform an INC fine tracking, when the specific conductance derivative ratio is located outside the threshold tracking zone, the controller uses the Ppv-Vpv curve to perform an PI coarse tracking, and when the first conductance derivative ratio is P1 and the second conductance derivative ratio is P2, where Vpv is an output voltage of the PV array, Ipv is an $$-\rho_1 > \frac{\Delta I_{pv} V_{pv}}{\Delta V_{pv} I_{pv}} > -\rho_2$$

output current of the PV array, ΔIpv is a change of the Ipv, and ΔVpv is a change of the Vpv.

6. A photovoltaic system with a photovoltaic current (Ipv), a photovoltaic voltage (Vpv) and a photovoltaic power (Ppv), comprising:

a controller having circuit characteristics represented by an Ipv-Vpv curve and a Ppv-Vpv curve, and
a control frequency (fs) and an output power (Po), wherein there is a derivative (dIpv/dVpv) of Ipv with respect to Vpv, the circuit characteristics are further represented by a dIpv/dVpv-Vpv curve, a dIpv/dVpv-fs curve, and a Po-fs curve.

7. A system according to claim 6, wherein the controller is guided by the circuit characteristics such that the photovoltaic system is engaged in an MPPT.

8. A system according to claim 6, wherein the system is one selected from a group consisting of a photovoltaic charger, a photovoltaic DC link converter and a photovoltaic inverter.

9. A system according to claim 8 being the photovoltaic charger and further comprising a photovoltaic (PV) array, an interleaved flyback converter and a battery, the interleaved flyback converter is electrically connected to the PV array, the battery is electrically connected to the interleaved flyback converter, the interleaved flyback converter includes a first flyback converter and a second flyback converter, the first flyback converter is electrically connected to the second flyback converter in parallel, and the first and the second flyback converters receive a pulse-width modulation signal from the PI-INC MPPT controller to cause the system to engage in an MPPT.

10. A system according to claim 9, wherein when a specific conductance derivative ratio on the Ipv-Vpv curve is located in a threshold tracking zone having a minimum value larger than a first conductance derivative ratio, and a maximum value smaller than a second conductance derivative ratio, the controller uses the Ipv-Vpv curve to engage in an INC fine tracking, when the specific conductance derivative ratio is located outside the threshold tracking zone, the controller uses the Ppv-Vpv curve to engage in a PI coarse tracking, and when the first conductance derivative ratio is p1 and the second conductance derivative ratio is p2, $$-\rho_1 > \frac{\Delta I_{pv} V_{pv}}{\Delta V_{pv} I_{pv}} > -\rho_2,$$

where Vpv is an output voltage of the PV array, Ipv is an output current of the PV array, Ipv is a change of the Ipv, and ΔVpv is a change of the Vpv.

11. A method for operating a controller of a photovoltaic system with a photovoltaic current (Ipv), a photovoltaic voltage (Vpv) and a photovoltaic power (Ppv), comprising a step of:
providing an Ipv-Vpv curve and a Ppv-Vpv curve, wherein a threshold tracking zone having a minimum value larger than a first conductance derivative ratio, and a maximum value smaller than a second conductance derivative ratio, the Ipv-Vpv curve, the Ppv-Vpv curve and the threshold tracking zone are provided to guide the controller; and
further comprising a step of: a) causing the controller to use a variable-frequency constant-duty control to engage in an MPPT.

12. A method according to claim 11 further comprising a step of: b) causing the controller to use the Ipv-Vpv curve to engage in an INC fine tracking when the specific conductance derivative ratio on the Ipv-Vpv curve is located in the threshold tracking zone.

13. A method according to claims 12 further comprising a step of: c) causing the controller to use the Ppv-Vpv curve to engage in a PI coarse tracking when the specific conductance derivative ratio is located outside the threshold tracking zone.

14. A method according to claim 11, wherein the photovoltaic system further comprises a photovoltaic (PV) array, and when the first conductance derivative ratio is p1 and the second conductance derivative ratio is p2, $$-\rho_1 > \frac{\Delta I_{pv} V_{pv}}{\Delta V_{pv} I_{pv}} > -\rho_2,$$

where Vpv is an output voltage of the PV array, Ipv is an output current of the PV array, pv is a change of the output current of the PV array Ipv, and ΔVpv is a change of the output voltage Vpv of the PV array.

15. A method according to claim 14, wherein the step b) further comprises sub-steps of:
when the specific conductance derivative ratio is smaller than p1, causing the Vpv to increase a positive value of ΔVpv via the controller so as to get a change ΔPpv of an output power Ppv of the PV array via the Ppv-Vpv curve and to stop when ΔPpv/ΔVpv≈dPpv/dVpv=0, where dPpv/dVpv is a derivative of Ppv with respect to Vpv;
when the specific conductance derivative ratio is larger than p2, causing the Vpv to decrease the positive value of ΔVpv via the controller so as to get the change ΔPpv of the output power Ppv of the PV array via the Ppv-Vpv curve and to stop when ΔPpv/ΔVpv ≈dPpv/dVpv=0;
when p1≤the conductance derivative ratio≤p2 and ΔIpv/ΔVpv>−Ipv/Vpv, causing the Vpv to decrease the positive value of ΔVpv via the controller so as to get the change ΔIpv of the output current Ipv of the PV array via the Ipv-Vpv curve and to stop when ΔIpv/ΔVpv=−Ipv/Vpv; and
when p1≤the conductance derivative ratio≤p2 and ΔIpv/ΔVpv<−Ipv/Vpv, causing the Vpv to decrease the positive value of ΔVpv via the controller so as to get the change ΔIpv of the output current Ipv of the PV array via the Ipv-Vpv curve and to stop when ΔIpv/ΔVpv=−Ipv/Vpv.

* * * * *

UNITED STATES PATENT AND TRADEMARK OFFICE
CERTIFICATE OF CORRECTION

PATENT NO. : 9,065,298 B2
APPLICATION NO. : 13/619468
DATED : June 23, 2015
INVENTOR(S) : Guan-Chyun Hsieh et al.

Page 1 of 1

It is certified that error appears in the above-identified patent and that said Letters Patent is hereby corrected as shown below:

In the Specification

Column 13, lines 15-16, change "smaller than $\beta 1$" to -- smaller than $\rho 1$ --.

Signed and Sealed this
Twentieth Day of October, 2015

Michelle K. Lee
*Director of the United States Patent and Trademark Office*